US008620087B2

(12) United States Patent
Iwamoto et al.

(10) Patent No.: US 8,620,087 B2
(45) Date of Patent: Dec. 31, 2013

(54) FEATURE SELECTION DEVICE

(75) Inventors: Kota Iwamoto, Tokyo (JP); Ryoma Oami, Tokyo (JP)

(73) Assignee: NEC Corporation, Tokyo (JP)

(*) Notice: Subject to any disclaimer, the term of this patent is extended or adjusted under 35 U.S.C. 154(b) by 16 days.

(21) Appl. No.: 13/056,767

(22) PCT Filed: Jan. 19, 2010

(86) PCT No.: PCT/JP2010/000246
§ 371 (c)(1),
(2), (4) Date: Jan. 31, 2011

(87) PCT Pub. No.: WO2010/087124
PCT Pub. Date: Aug. 5, 2010

(65) Prior Publication Data
US 2011/0135203 A1 Jun. 9, 2011

(30) Foreign Application Priority Data

Jan. 29, 2009 (JP) ................................ 2009-017806

(51) Int. Cl.
*G06K 9/46* (2006.01)
*G06K 9/62* (2006.01)

(52) U.S. Cl.
USPC ............ 382/192; 382/190; 382/195; 382/159

(58) Field of Classification Search
USPC ......... 382/100, 103, 107, 115, 119, 168, 159, 382/224, 229, 190, 192, 181, 199; 345/158; 348/169
See application file for complete search history.

(56) References Cited

U.S. PATENT DOCUMENTS 6,016,354 A * 1/2000 Lin et al. ................... 382/117
6,157,741 A * 12/2000 Abe et al. .................. 382/233
(Continued)

FOREIGN PATENT DOCUMENTS

JP    08-500471 A    1/1996
JP    2002-142094 A    5/2002
(Continued)

OTHER PUBLICATIONS

Law-To et al. "Video Copy Detection: a Comparative Study" CIVR (2007) Jul. 9-11 ACM pp. 1-8.*
(Continued)

*Primary Examiner* — Chan S Park
*Assistant Examiner* — Mia M Thomas
(74) *Attorney, Agent, or Firm* — Sughrue Mion, PLLC

(57) ABSTRACT

The feature selection device includes a feature extraction unit that extracts M types of features from each of a plurality of original images and each of a plurality of altered images obtained by applying an alteration process to the plurality of original images; and a feature selection unit that handles an original image and an altered image of the original image as identical images and handles altered images of the same original image as identical images, while handles other images as different images, and with use of discrimination capability which is a degree of discriminating different images and robustness which is a degree that a value of a feature does not vary due to the alteration process applied to an image as evaluation criteria, evaluates the M types of features extracted from the respective images, and selects a collection of N types of features, the N types being smaller in number than that of the M types, from the M types of features as features for discriminating images.

21 Claims, 6 Drawing Sheets

(56) References Cited

U.S. PATENT DOCUMENTS

| | | | |
|---|---|---|---|
| 6,292,583 B1* | 9/2001 | Maruo | 382/149 |
| 6,606,620 B1* | 8/2003 | Sundaresan et al. | 1/1 |
| 6,940,999 B2* | 9/2005 | Lin | 382/103 |
| 7,346,210 B2* | 3/2008 | Chen | 382/162 |
| 7,356,190 B2* | 4/2008 | Mizoguchi et al. | 382/233 |
| 7,366,909 B2* | 4/2008 | Zhou et al. | 713/176 |
| 7,394,940 B2* | 7/2008 | Kahan | 382/233 |
| 7,454,064 B2* | 11/2008 | Mishima | 382/190 |
| 7,522,776 B2* | 4/2009 | Kahan | 382/233 |
| 7,542,615 B2* | 6/2009 | Mizoguchi et al. | 382/233 |
| 7,680,357 B2* | 3/2010 | Yonaha et al. | 382/281 |
| 7,848,592 B2* | 12/2010 | Chen et al. | 382/283 |
| 7,881,516 B2* | 2/2011 | Chen et al. | 382/132 |
| 2001/0052928 A1* | 12/2001 | Imagawa et al. | 348/14.12 |
| 2002/0015523 A1* | 2/2002 | Okada et al. | 382/167 |
| 2002/0071593 A1* | 6/2002 | Muratani | 382/100 |
| 2002/0138492 A1* | 9/2002 | Kil | 707/100 |
| 2002/0164070 A1* | 11/2002 | Kuhner et al. | 382/159 |
| 2002/0178368 A1* | 11/2002 | Yin et al. | 713/186 |
| 2003/0161536 A1* | 8/2003 | Iwamura et al. | 382/218 |
| 2003/0202660 A1* | 10/2003 | Zhou et al. | 380/210 |
| 2003/0215119 A1* | 11/2003 | Uppaluri et al. | 382/128 |
| 2005/0021317 A1* | 1/2005 | Weng et al. | 703/2 |
| 2005/0169516 A1* | 8/2005 | Okajima et al. | 382/159 |
| 2005/0276454 A1* | 12/2005 | Beatson et al. | 382/119 |
| 2006/0093221 A1* | 5/2006 | Kasutani | 382/191 |
| 2006/0117183 A1* | 6/2006 | Hatano et al. | 713/176 |
| 2006/0120561 A1* | 6/2006 | Muratani | 382/100 |
| 2007/0063884 A1* | 3/2007 | Iwamura et al. | 341/156 |
| 2007/0071282 A1* | 3/2007 | Isogai | 382/100 |
| 2007/0100624 A1* | 5/2007 | Weng et al. | 704/257 |
| 2007/0253592 A1* | 11/2007 | Sun et al. | 382/100 |
| 2008/0025638 A1* | 1/2008 | Chen et al. | 382/284 |
| 2008/0089552 A1* | 4/2008 | Nakamura et al. | 382/100 |
| 2008/0118137 A1* | 5/2008 | Chen et al. | 382/131 |
| 2008/0212098 A1* | 9/2008 | Sato et al. | 356/400 |
| 2008/0279416 A1* | 11/2008 | Lo et al. | 382/100 |
| 2009/0087036 A1* | 4/2009 | Imaoka | 382/118 |
| 2009/0232399 A1* | 9/2009 | Kawahara et al. | 382/190 |
| 2009/0257656 A1* | 10/2009 | Shi et al. | 382/190 |
| 2009/0274364 A1* | 11/2009 | Shakya et al. | 382/165 |
| 2009/0296989 A1* | 12/2009 | Ramesh et al. | 382/103 |
| 2010/0177969 A1* | 7/2010 | Huang et al. | 382/224 |
| 2011/0026788 A1* | 2/2011 | Elter et al. | 382/128 |
| 2011/0135203 A1* | 6/2011 | Iwamoto et al. | 382/190 |
| 2011/0170784 A1* | 7/2011 | Tanaka et al. | 382/195 |
| 2011/0199499 A1* | 8/2011 | Tomita | 348/222.1 |
| 2011/0241991 A1* | 10/2011 | Ogura et al. | 345/158 |
| 2011/0304730 A1* | 12/2011 | Chen et al. | 348/143 |
| 2012/0082370 A1* | 4/2012 | Yasukawa et al. | 382/154 |
| 2012/0283574 A1* | 11/2012 | Park et al. | 600/476 |

FOREIGN PATENT DOCUMENTS

| | | |
|---|---|---|
| JP | 2006-338092 A | 12/2006 |
| JP | 2008-158776 A | 7/2008 |
| WO | 2006129551 A1 | 12/2006 |
| WO | WO 2007/119204 * | 4/2007 |

OTHER PUBLICATIONS

Iwamoto et al. "Detection of Wipes and Digital Video Effects Based on a Pattern Independent Model of Image Boundary Line Characteristics" IEEE (2007) pp. 1-4.*

Iwamoto et al. "Image Signature to Caption Superimposition for Video Sequence Identification" IEEE (2006) pp. 1-4.*

Houmansadr et al. "Robust Content Based Video Watermarking Exploiting Motion Entropy Masking Effect" IEEE (Oct. 2004) pp. 1-4.*

Chen et al. "Quantization Index Modulation: A Class of Provably Good Methods for Digital Watermarking and Information Embedding" ISIT (2000) p. 1-1.*

Fergus et al. "Object Class Recognition by Unsupervised Scale Invariant Learning" Computer Vision and Pattern Recg. (2003) IEEE Computer Society Conference. vol. 2, pp. 1-8.*

K. Iwamoto, et al., "Image Signature Robust to Caption Superimposition for Video Sequence Indentification," IEEE, ICIP 2006, 2006, pp. 3185-3188.

A. Hampapur, et al., "Comparison of Distance Measures for Video Copy Detection," IEEE International Conference on Multimedia and Expo, 2001, pp. 944-947.

Choksuriwong et al. "Comparative Study of Global Invariant Descriptors for Object Recognition." Journal of Electronic Imaging, vol. 27, No. 2, pp. 023015-1 through 023015-10, Jan. 1, 2008.

Extended European Search Report dated Oct. 12, 2011 from the European Patent Office in counter application No. 10735596.8.

Solberg et al. "A Study of the Invariance Properties of TExtual Features in SAR Images." 1995 International Geoscience and Remote Sensing Symposium, IGARSS '95. Quantitative Remote Sensing for Science and Applications (Cat. No. 95CH35770) IEEE New York, NY, vol. 1, pp. 670-672, 1995.

Office Action dated Mar. 5, 2013 issued by the State Intellectual Property Office of the People's Republic of China in counterpart Chinese Patent Application No. 201080005948.6.

* cited by examiner

FEATURE SELECTION DEVICE

CROSS REFERENCE TO RELATED APPLICATIONS

This application is a National Stage of International Application No. PCT/JP2010/000246 filed Jan. 19, 2010, claiming priority based on Japanese Patent Application No. 2009-017806 filed Jan. 29, 2009, the contents of all of which are incorporated herein by reference in their entirety.

TECHNICAL FIELD

The present invention relates to devices for selecting features, and in particular, to devices for selecting features suitable for image signatures for discriminating images (determining identity of images).

BACKGROUND ART

Image signatures are image features for discriminating images (determining identity). By comparing an image signature extracted from an image with an image signature extracted from another image, an identity scale (in general, referred to as similarity or distance) indicating a degree of the two images being identical can be calculated from a comparison result. Further, by comparing the calculated identity scale with a threshold, it is possible to determine whether or not the two images are identical. In this context, the meaning of "two images being identical" includes not only the case where the two images are identical at the level of image signals (pixel values of pixels constituting the images), but also the case where one image is a duplicate image of the other by means of various alteration processes such as conversion of compression format of an image, conversion of size/aspect ratio of an image, adjustment of color tone of an image, various filtering processes (sharpening, smoothing, and the like) applied to an image, local processing (caption superimposition, cutout, and the like) applied to an image, and recapturing of an image. By using image signatures, as it is possible to detect duplication of an image or a moving image which is a collection of images, for example, image signatures are applicable to an illegal copy detection system for images or moving images.

An image signature is generally formed of a collection of features. Given that each of the features included in a collection is a dimension, an image signature is composed of feature vectors of multiple dimensions. In particular, a quantization index (quantized value), which is a discrete value, is often used as a feature. Examples of image signatures are described in Non-Patent Document 1, Non-Patent Document 2, and Patent Document 1. In the methods described in those documents, features are extracted for a plurality of local regions of an image, the extracted features are quantized to obtain quantization indexes, and the calculated quantization indexes for the respective local regions constitute quantization index vectors to serve as image signatures.

Specifically, in Non-Patent Document 1 and Non-Patent Document 2, an image is divided into blocks. Each of the blocks is used as a local region, and a feature (quantization index) is extracted. Further, in Non-Patent Document 1, luminance distribution patterns within a block are classified into eleven types and are used as quantization indexes. In Non-Patent Document 2 (art described as "Local Edge Representation" in Non-Patent Document 2), a position of center of gravity of an edge point, extracted from a block, is quantized to be used as a quantization index.

On the other hand, as shown in FIG. 5, the method described in Patent Document 1 includes respectively calculating mean luminance values from thirty two pieces of rectangle regions 244 (among them, sixteen pieces of rectangle regions are shown in FIG. 5) at predetermined positions in an image 240, and calculating differences in mean luminance value between rectangle regions forming pairs (the paired rectangle regions are linked to each other with dotted lines 248 in FIG. 5), to thereby obtain a difference vector 250 in sixteen dimensions. With respect to the difference vector 250, a composite vector is generated by means of vector transformation, and a quantization index vector in sixteen dimensions, acquired by quantizing the respective dimensions of the composite vector, is used as an image signature.

When designing such an image signature formed of a collection of features, selecting features to be used (what types of parameters are used for feature extraction) is important because it determines performance (accuracy of determining identity of images) of the image signature. In an image signature formed of a collection of features, performance of the image signature can be improved by appropriately selecting the features.

As such, it is important to select features suitable for (optimizing the performance of) an image signature formed of a collection of features (that is, features enabling high determination accuracy of identity of images).

Regarding the image signatures described in Non-Patent Document 1, Non-Patent Document 2, and Patent Document 1, each of the features is extracted from a local region determined for each feature (different from each other). As such, in the examples of those documents, performance of the image signature is determined depending on a local area from which the feature is extracted (what kind of local area is set for each feature).

In general, when designing an image signature formed of a collection of features, determination (selection) of the features (parameters for extracting features) has often been performed according to empirical knowledge or trial and error experiments. For example, in Non-Patent Documents 1 and 2, a local region for each of the features is a block formed by regularly dividing an image. In Non-Patent Document 1, for example, an image is regularly divided into 8*8=64 blocks, and each of the blocks is used as a local region to extract a feature. However, it is difficult to optimize performance of an image signature (accuracy in determining identity of images) by such empirical knowledge or trial and error experiments.

Meanwhile, art of automatically selecting features to optimize performance (referred to as a feature selection technique) is used in the field of pattern recognition. Specifically, methods using Principal Component Analysis (PCA) and Linear Discriminant Analysis (LDA) have been known.

PRIOR ART DOCUMENTS

Patent Document

Patent Document 1: Japanese Unexamined Patent Publication No. 8-500471

Non-Patent Documents

Non-Patent Document 1: Kota Iwamoto, Eiji Kasutani, Akio Yamada, "Image Signature Robust to Caption Superimposition for Video Sequence Identification", Proceedings of International Conference on Image Processing (ICIP2006), 2006

Non-Patent Document 2: Arun Hampapur, Ruud M. Bolle, "Comparison of Distance Measures for Video Copy Detection", Proceedings of International Conference on Multimedia and Expo (ICME2001), p. 946, 2001

SUMMARY OF THE INVENTION

Problems to be Solved by the Invention

When selecting features suitable for (optimizing the performance of) an image signature formed of a collection of features, that is, selecting features enabling high determination accuracy of the identity of images, two requirements, namely discrimination capability which is a degree of discriminating different images and robustness which is a degree that a value of a feature does not vary due to various alteration processes applied to the image, must be satisfied.

However, in the feature selection techniques described above, as features are not selected while considering both discrimination capability which is a degree of discriminating different images and robustness which is a degree that a value of a feature does not vary due to various alteration processes applied to the image, this techniques involve a problem that the performance of an image signature cannot be optimized (determination accuracy of the identity of images cannot be optimized). Specifically, as the method by means of Principal Component Analysis (PCA) maximizes information held by the entire distribution of the features, robustness of the features is not considered (feature selection considering robustness of the features cannot be performed). Further, while a method by means of Linear Discriminant Analysis (LDA) is suitable for selecting features for classification (for classifying into a limited number of classes), it is not suitable for feature selection for a (image) signature for which classes have not been defined (this method is not a feature selection considering discrimination capability and robustness of image signatures).

Object of the Invention

In view of the above, an object of the present invention is to provide a feature selection device capable of solving a problem that it is difficult to optimize performance (discrimination accuracy of the identity of images) of image signatures.

Means for Solving the Problems

According to an aspect of the present invention, a feature selection device includes a feature extraction unit that extracts M types of features from each of a plurality of original images and each of a plurality of altered images obtained by applying an alteration process to the plurality of original images; and a feature selection unit that handles original images and altered images of the original images as identical images and handles altered images of the same original image as identical images, while handles other images as different images, and with use of discrimination capability which is a degree of discriminating different images and robustness which is a degree that a value of a feature does not vary due to the alteration process applied to an image as evaluation criteria, evaluates the M types of features extracted from the respective images, and selects a collection of N types of features, the N types being smaller in number than that of the M types, from the M types of features as features for discriminating images.

Effects of the Invention

As the present invention is configured as described above, the present invention is able to optimize performance (discrimination accuracy of the identity of images) of image signatures formed of a collection of features for discriminating images.

DESCRIPTION OF EMBODIMENT

Next, an embodiment of the present invention will be described in detail with reference to the drawings.

First Embodiment

A feature extraction device according to the present embodiment uses a group of images included in an image database to select, from M types of features, N types of features which are smaller in number than that of M types (N<M) suitable for an image signature, and output information indicating the selected N types of features. It should be noted that "features suitable for an image signature" means features enabling to improve determination accuracy of the identity of images. A group of N types of features, selected by the feature selection device according to the invention are used as features of respective dimensions in N-dimensional feature vectors (image signature). As a method of matching N-dimensional feature vectors (image signatures), that is, as a method of calculating an identity scale, a method of calculation based on comparison between values of identical features (in a corresponding dimension) (for example, calculating the number of dimensions in which feature values (quantization indexes) matches as a similarity or calculating a Hamming distance, a Euclidean distance, a cosine similarity (inner product) or the like). Further M and N are not necessarily predetermined numerical values (constant numbers) but may be indefinite numbers if they are positive integer numbers satisfying M>2 and N<M.

Figure 1:
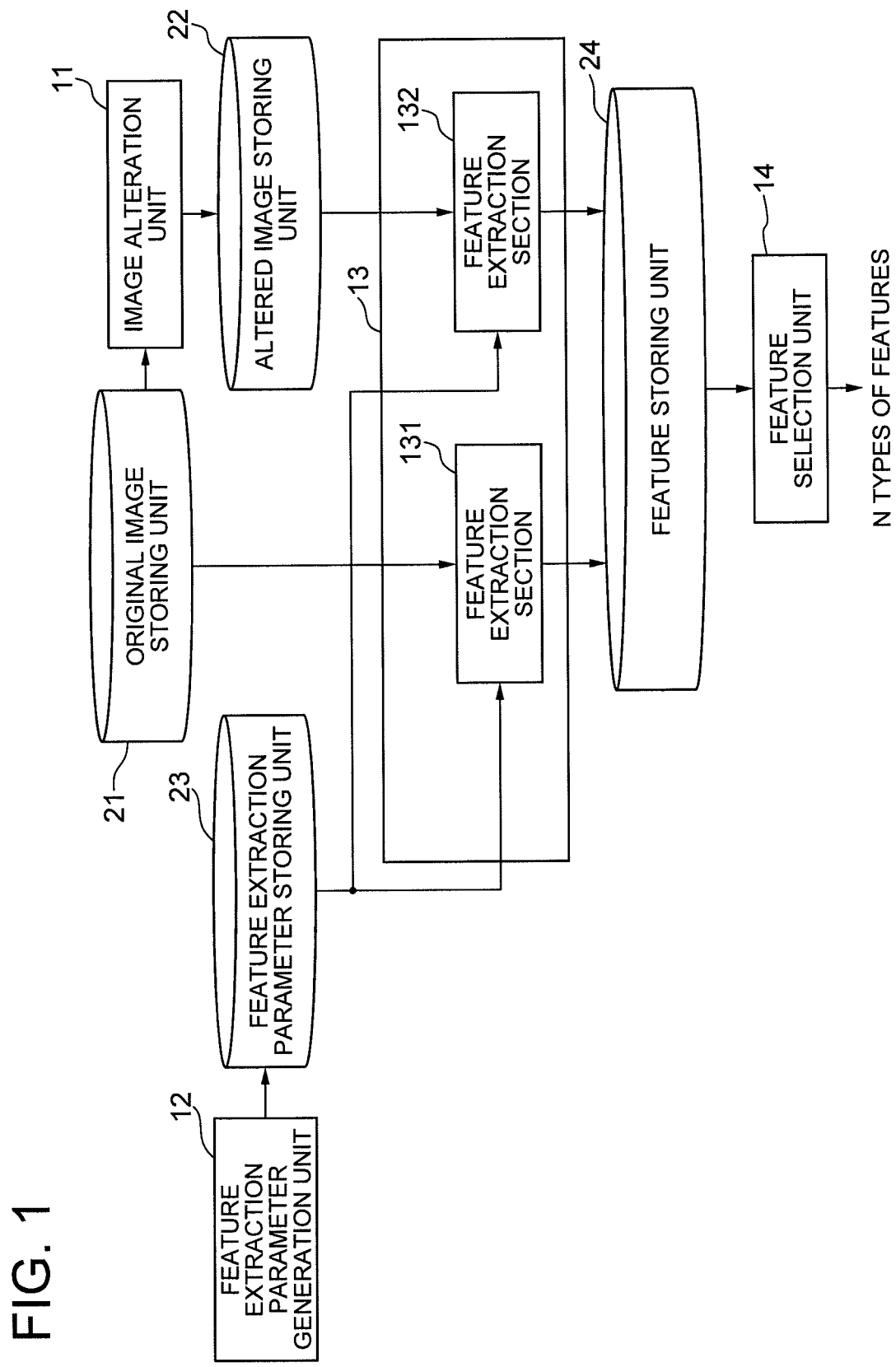
FIG. 1 is a block diagram showing a first embodiment of the present invention.

Referring to FIG. 1, the feature extraction device according to the first embodiment of the present invention includes an image alteration unit 11, a feature extraction parameter generation unit 12, a feature extraction unit 13, a feature selection unit 14, an original image storing unit 21, an altered image storing unit 22, a feature extraction parameter storing unit 23, and a feature storing unit 24.

The original image storing unit 21 is an image database which stores a plurality of original images in association with image IDs such as numbers for uniquely identifying the respective original images. The original images stored in the original image storing unit 21 are used for selecting features suitable for image signatures by the feature selection device according to the present embodiment. The original images stored in the original image storing unit 21 are supplied to the image alteration unit 11 and the feature extraction unit 13.

As the group of original images stored in the original image storing unit 21 is used for selecting features suitable for image signatures, it is desirable to include as many original images as possible (for example, not less than ten thousand images). Further, as the group of original images stored in the original image storing unit 21 is used for selecting features suitable for image signatures, it is desirable that it is a group of images having the same trend (similar trend) to that of an object group of images for which image signatures generated from the features selected by the feature selection device of the present embodiment are used. For example, if an object for which image signatures are used is an image or a moving image on the Internet (for example, if image signatures are used for detecting an illegal copy of an image or a moving image on the Internet), it is desirable that the group of original images stored in the original image storing unit 21 should be a group of images taken evenly and uniformly as samples of the images on the Internet. Further, if an object for which image signatures are used is limited to a landscape image, for example, it is desirable that the group of original images stored in the original image storing unit 21 should be a group of images taken as samples from various landscape images. Further, if an object for which image signatures are used is limited to a painting image, for example, it is desirable that the group of original images stored in the original image storing unit 21 should be a group of images taken as samples from various painting images. Further, if various types of images are mixed in an object group of images for which image signatures are used, it is desirable that the group of original images stored in the original image storing unit 21 should include various types of images in the same ratio as that of the object group of images.

As described above, if the group of original images stored in the original image storing unit 21 is a group of images having the same trend (similar trend) to that of an object group of images for which image signatures are used, as it is possible to select more suitable features as image signatures for distinguishing an image with respect to the object group of images, image signatures having higher determination accuracy of the identity of images can be configured.

The image alteration unit 11 applies an alteration process to an original image supplied from the original image storing unit 21 to generate an altered image. The generated altered image is stored in the altered image storing unit 22 in association with the original image, which is the source, such that the original image of the generated altered image is clearly indicated. To associate the original image and its altered image, any methods may be used. One exemplary method is to apply an image ID to the original image, and apply a value, in which a branch number for uniquely discriminating each of altered images generated from the original image is linked, to each of the altered images as an image ID of the altered image.

Exemplary alteration processes include the following processes. However, these are only given as examples, and the alteration processes are not limited to them. Further, the image alteration unit 11 may perform a combination of these processes (e.g., (A)+(D)).

(A) Conversion of the compression format of an image.

(B) Conversion of the size/aspect ratio of an image.

(C) Adjustment of color tone and conversion of the color of an image to monochrome.

(D) Various filtering processes performed on an image (sharpening, smoothing, etc.).

(E) Local processing performed on an image (caption superimposition, cutting, etc.)

(F) Geometric conversion including rotation, parallel movement, and cropping of an image.

(G) Addition of black bars to an image (black bars indicate black margin areas to be inserted into up and down or right and left portions due to an aspect conversion of 4:3 to 16:9, for example.)

(H) Recapturing of an image.

The image alteration unit 11 may perform various types of alteration processes to each of the original images stored in the original storing unit 21 to generate a plurality of types of altered images (this means that the number of altered images may be larger than the number of original images).

Further, it is preferable that the alteration process performed by the image alteration unit 11 is the same as (has the same trend as that of) an alteration process applied to an image for which image signatures generated from the features selected by the feature selection device of the present embodiment are used, and an alteration process in which robustness is required in the object for which the image signatures are used. For example, in a system which is an object for which image signatures are used, if robustness relative to the above items (A), (B), (C), and (D) is required (or alteration processes of (A), (B), (C), and (D) are performed in the system), it is desirable that the image alteration unit 11 performs alteration processes of (A), (B), (C), and (D). Further, if various alteration processes are to be performed on the object for which image signatures are used, for example, it is desirable that the image alteration unit 11 performs various types of alteration processes at the same rate as that performed on the object. As described above, by allowing the image alteration unit 11 to perform alteration processes which are the same as (have the same trend as that of) the alteration processes performed on the object for which image signatures are used or the alteration processes required robustness, it is possible to select more robust features as image signatures for discriminating an image with respect to the object, whereby it is possible to configure image signatures having higher determination accuracy of the identity of images.

The feature extraction parameter generation unit 12 generates a feature extraction parameter, which is a parameter for extracting a feature from an image, for each of the M types of features. The generated M types of feature extraction parameters are stored in the feature extraction parameter storing unit 23. It should be noted that although the present embodiment includes the feature extraction parameter generation unit 12 which generates the M types of feature extraction parameters, an embodiment not including the feature extraction parameter generation unit 12 is also possible. In the configuration not including the feature extraction parameter generation unit 12, M type of parameters, generated by a unit identical or similar to the feature extraction parameter generation unit 12 or created manually, are stored in the feature extraction parameter storing unit 23 beforehand.

In this embodiment, while M may take any numerical value if it is larger than N which is the number of features selected as features of an image signature (N<M), M is desirably several times or tens of times larger than N. For example, if the number N of the features selected as features of an image signature is about 500 (it should be noted that an appropriate value of N can be determined from requirement conditions such as identity determination accuracy of the image signature, the size of the image signature, matching speed, and the like), M is desirably about 2000 to 5000 or larger. As the number M becomes larger (by generating more types of features), a possibility of selecting more appropriate N types of features becomes higher, whereby it is possible to configure an image signature having higher determination accuracy of the identity of images.

The M types of features extracted by the M types of feature extraction parameters may be of any types. However, the features are desirably improved so as to be effective to larger types of images. An example thereof will be described with reference to FIG. 2.

Figure 2:
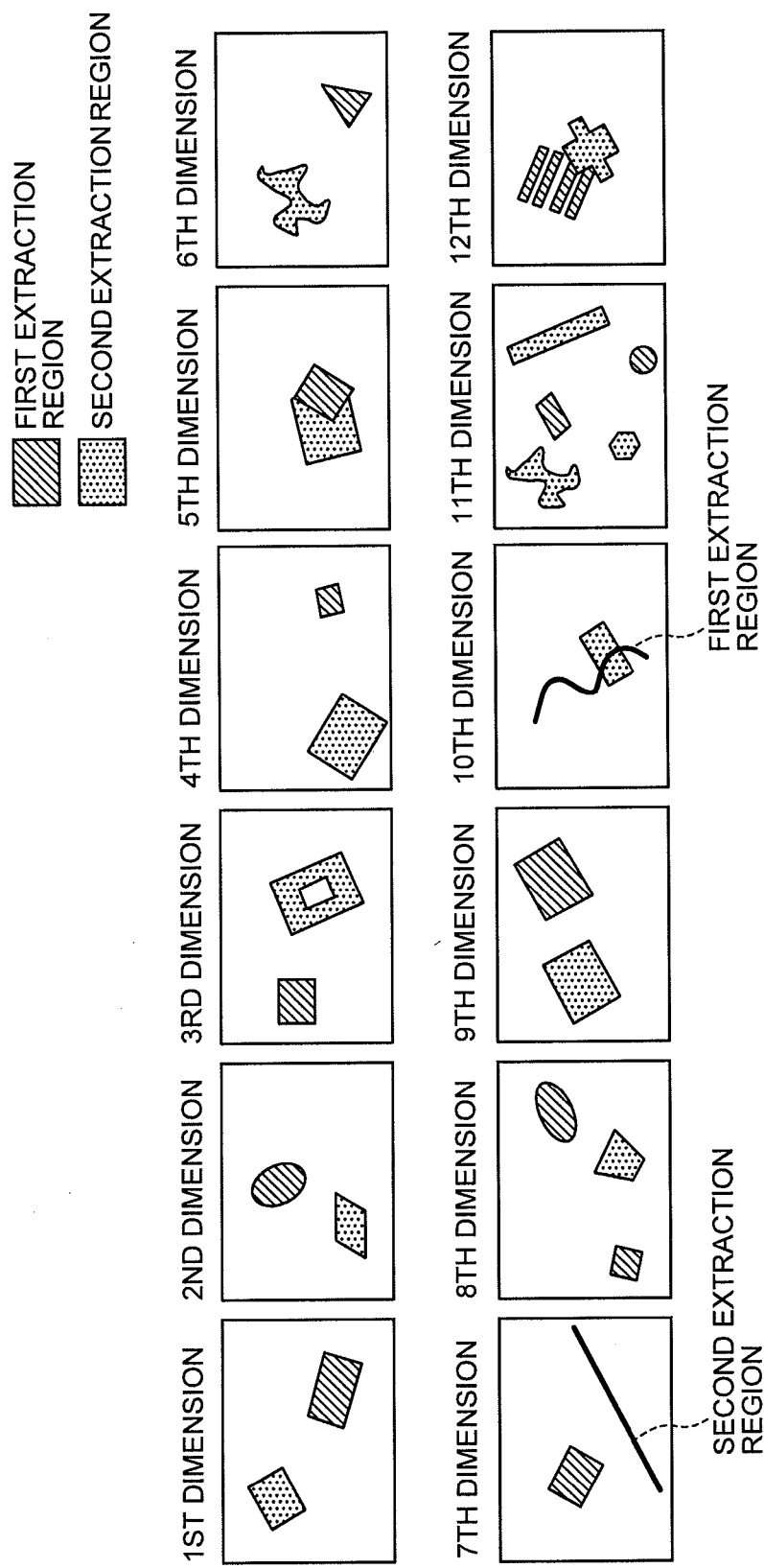
FIG. 2 is an illustration showing a method of extracting multi-shape region comparison features.

FIG. 2 is an illustration showing an extraction method of exemplary features (hereinafter referred to as multi-shape region comparison features) which are improved to be effective with respect to a larger number of types of images. For multi-shape region comparison features, two extraction regions (a first extraction region and a second extraction region) within an image are set beforehand to extract features for each dimension of a feature vector. A significant difference between the multi-shape region comparison feature and the feature described in Patent Document 1 is that shapes of extraction regions have variations. In order to extract multi-shape region comparison features, calculating, for each dimension, mean luminance values of the first extraction region and the second extraction region set for each dimension, and comparing the mean luminance value of the first extraction region with the mean luminance value of the second extraction region (that is, based on a difference value), quantizing the difference into three values (+1, 0, −1) to thereby obtain an quantization index. If the absolute value of the difference value between the mean luminance value of the first extraction region and the mean luminance value of the second extraction region is lower than or equal to a set threshold, it is determined that the mean luminance values of the first extraction region and the second extraction region have no difference, so that a quantization index is set to be 0, which indicates no difference. In other cases, the mean luminance value of the first extraction region and the mean luminance value of the second extraction region are compared, and if the mean luminance value of the first extraction region is larger, the quantization index is set to be +1, while the quantization index is set to be −1 in other cases. Assuming that the mean luminance value of the first extraction region is Vn1 and the mean luminance value of the second extraction region is Vn2 in a dimension n and a set threshold is th, the quantization index Qn in the dimension n can be calculated from the following formula.

$$Qn = +1 (\text{if}|Vn1 - Vn2| > th \text{ and } Vn1 > Vn2)$$
$$= 0 (\text{if}|Vn1 - Vn2| \le th)$$
$$= -1 (\text{if}|Vn1 - Vn2| > th \text{ and } Vn1 \le Vn2)$$

(Formula 1)

In the multi-shape region comparison feature, the feature extraction parameter corresponding to the feature is information indicating the first extraction region and the second extraction region of each feature. For example, a collection of pixel coordinate values of a first extraction region and a collection of pixel coordinate values of a second extraction region in a normalized image size (for example, 320*240 pixels) may be feature extraction parameters. The extraction regions may be represented by fewer parameters. For example, if the shape of an extraction region is a quadrangle, the coordinates of the four corners of the quadrangle may be used as a feature extraction parameter, while if the shape of an extraction region is a circle, the coordinates of the center of the circle and the radius value may be used as a feature extraction parameter. Further, if a threshold th is different for respective types of features, the threshold th may be included in the feature extraction parameter.

The feature extraction parameter generation unit 12 may automatically generate feature extraction parameters for M types of multi-shape region comparison features according to pseudo random numbers, for example. For example, it is possible to generate a random number string from seeds of pseudo random numbers, and based on the generated random numbers, automatically generate shapes of extraction regions or thresholds th. For example, if the shape of an extraction region is a quadrangle, it is possible to automatically generate coordinates of the four corners of the quadrangle based on the generated random numbers.

It should be noted that in the multi-shape region comparison features, the M types of features have an identical characteristic of a mean luminance value. However, the M types of features are not limited to features having the same characteristics. Features having different characteristics such as color information, frequency information, and edge information may be mixed in the M types of features. As such, feature extraction parameters may be generated in which part of the M types of features is multi-shape region comparison features, part thereof is features based on color information, part thereof is features based on frequency information, and part thereof is features based on edge information.

The feature extraction unit 13 receives the original image stored in the original image storing unit 21 and the altered image stored in the altered image storing unit 22, and extracts M types of features from the original image and the altered image respectively, according to the feature extraction parameters providing methods of extracting the M types of features stored in the feature extraction parameter storing unit 23. The feature extraction unit 13 has two extraction sections, which are a feature extraction unit 131 for extracting the M types of features from the original image, and a feature extraction unit 132 for extracting the M types of features from the altered image. The two feature extraction units 131 and 132 may be operated in parallel or in order.

The M types of features extracted from the original image and the M types of features extracted from the altered image are stored in the feature storing unit 24. The feature storing unit 24 stores the M types of features extracted from the original image and the M types of features extracted from the altered image in association with each other. For associating them with each other, any methods may be used. For example, if the image ID of the altered image is one in which a branch number is added to the image ID of the original image, applying the image ID of the original image to the group of M types of features extracted from the original image, and applying the image ID of the altered image to the group of M types of features extracted from the altered image of the original image. Thereby, by identifying the image ID, association between the M types of features extracted from the original image and the M types of features extracted from the altered image of the original image can be recognized.

Figure 3:
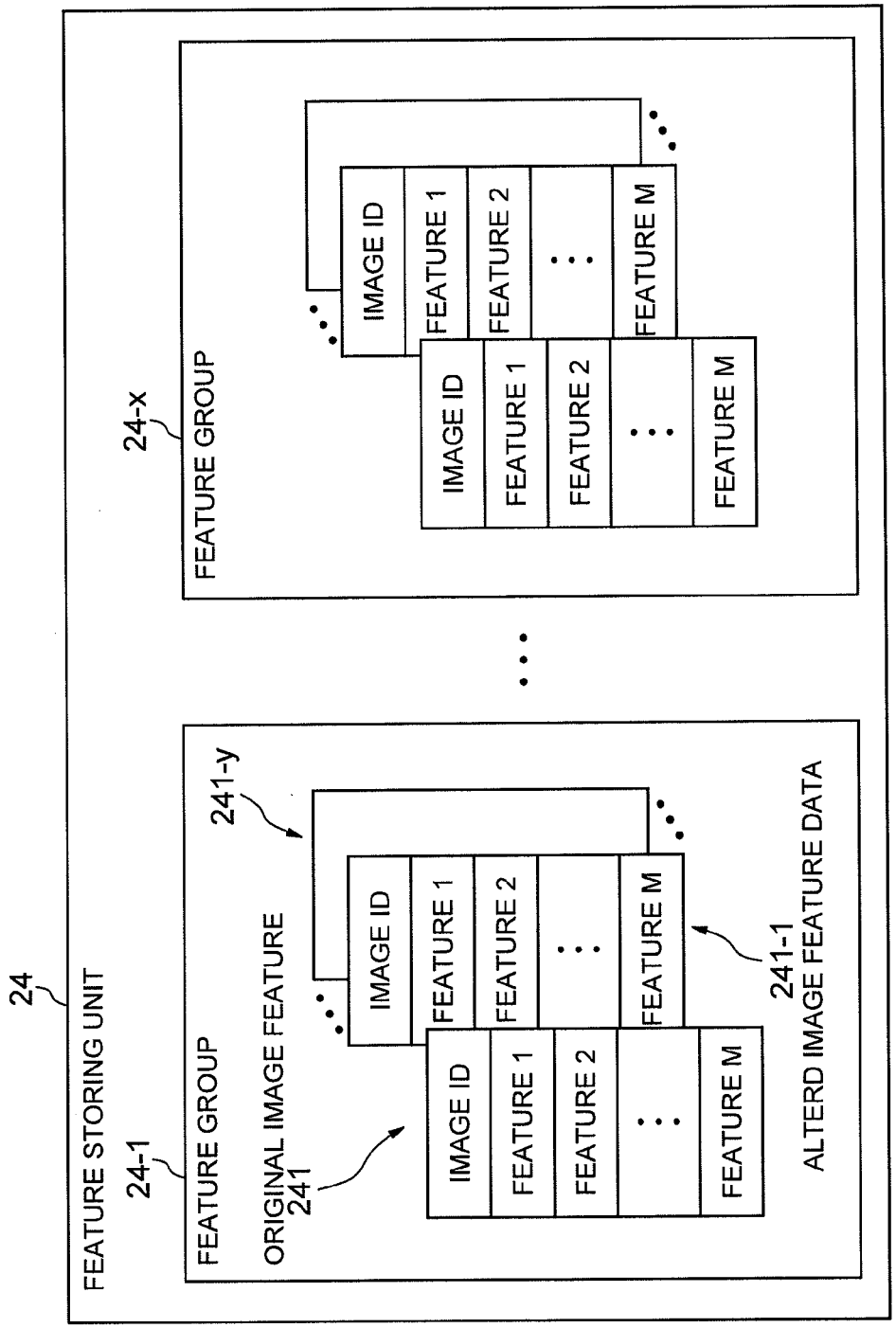
FIG. 3 is an illustration showing exemplary data stored in a feature storing unit.

FIG. 3 shows an example of data stored in the feature storing unit 24. The feature storing unit 24 of this example stores groups of features 24-1 to 24-x, corresponding one to one to the original images stored in the original image storing unit 21. One group of features, that is, a group of features 24-1 for example includes original image feature data 241 consisting of the image ID of the original image and M types of features extracted from the original image, and a plurality of altered image feature data 241-1 to 241-y each consisting of the image ID of an altered image of the original image and M types of features extracted from the altered image. It should be noted that images belonging to the same group of features (that is, one original image and its altered images) are handled as identical images, and images belonging to different groups of features are handled as different images.

The feature selection unit 14 uses the values of the M types of features extracted from the original image stored in the feature storing unit 24 and the values of the M types of features extracted from the altered images to select a collection of N types of features such that the sum of the discrimination capability which is a degree of discriminating different images, held by the collection of features, and the robustness which is a degree that the values of the features do not vary due to alteration processes performed on the images, held by the collection of features, becomes larger. Hereinafter, the function of the feature selection unit 14 will be described in detail.

In this embodiment, N types of features to be selected are represented as an index "n" (n=1, 2, ... N). With respect to the N types of features to be selected, the value of a feature extracted from the group of original images is represented as a probability variable $X_n$, and the value of a feature extracted from the group of altered images is represented as a probability variable $X'_n$. For example, if the feature is the above-described multi-shape region comparison feature, the feature can be regarded as a probability variable which takes any value (quantization index) of $\{+1, 0, -1\}$.

Further, in the N types of features to be selected, a collection of probability variables $X_n$ of the features extracted from the group of original images and a collection of probability variables $X'_n$ of the features extracted from the group of altered images are respectively represented as $$S_N = \{X_1, X_2, \ldots X_N\}$$

$$S'_N = \{X'_1, X'_2, \ldots X'_N\}$$

The discrimination capability which is a degree of discriminating different images, held by a collection of features, can be calculated with respect to the collection $S_N = \{X_1, X_2, \ldots X_N\}$. The discrimination capability held by the collection $S_N = \{X_1, X_2, \ldots X_N\}$ is represented as $D(S_N)$. A larger value of $D(S_N)$ shows higher discrimination capability.

The robustness which is a degree that the values of features doe not vary due to the alteration process applied to images is calculated from the collection $S_N = \{X_1, X_2, \ldots X_N\}$ and the collection $S'_N = \{X'_1, X'_2, \ldots X'_N\}$ corresponding thereto. The robustness held by the collection $S_N = \{X_1, X_2, \ldots X_N\}$ and the collection $S'_N = \{X'_1, X'_2, \ldots X'_N\}$ is represented as $R(S_N, S'_N)$. A larger value of $R(S_N, S'_N)$ shows higher robustness.

The sum $E(S_N, S'_N)$ of the discrimination capability and the robustness held by the collections of features is given by the following evaluation formula 2.

$$E(S_N, S'_N) = D(S_N) + R(S_N, S'_N) \quad \text{[Formula 2]}$$

The feature selection unit 14 selects collections of N types of features such that the value of $E(S_N, S'_N)$ given by the evaluation formula 2 becomes larger. For example, collections of N types of features which allow the value of $E(S_N, S'_N)$ to be maximum may be selected (in a lump). Alternatively, features may be selected (added) sequentially such that the value of $E(S_N, S'_N)$ becomes larger to thereby select collections of features.

Hereinafter, a specific example of a method of calculating discrimination capability $D(S_N)$ and robustness $R(S_N, S'_N)$, in the case where values of features are discrete values (quantization index), will be described. In this example, a collection of values which may be taken by features, that is, a collection of values which may be taken by the probability variable $X_n$ and the probability variable $X'_n$ is represented as $\chi_n = \{x_n\}$. For example, if the features are the above-described multi-shape region comparison features, $\chi_n = \{+1, 0, -1\}$.

[Specific Example of Discrimination Capability $D(S_N)$ Calculation Method]

(1) The discrimination capability held by a collection of features can be larger as the information entropy of respective features is larger, for example. As the information entropy is larger, the appearance probability of values (probability variables $X_n$) taken by the respective features becomes close to uniform, so that redundancy is decreased and the discrimination capability is increased. In contrast, if appearance probabilities of values (probability variables Xn) which may be taken by the respective features are biased toward particular values, redundancy is increased, and as the information entropy is decreased, the discrimination capability is decreased.

Accordingly, the discrimination capability $D(S_N)$ held by the collection of features can be calculated as the sum of information entropies of the respective features.

Information entropy $H(X_n)$ of the probability variable $X_n$ of a feature n is calculated from the following formula.

$$H(X_n) = -\Sigma_{AA} p(x_n) \log p(x_n) \quad \text{[Formula 3]}$$

where the lower index AA of $\Sigma$ represents $x_n \in \chi_n$.

In this example, $p(x_n) = \Pr(X_n = x_n)$, which can be calculated from the value of the feature of the group of original images to be supplied. For example, if the feature n is a multi-shape region comparison feature described above, $p(+1) = \Pr(X_n = +1)$, $p(0) = \Pr(X_n = 0)$, and $P(-1) = \Pr(X_n = -1)$, whereby probabilities that the value of the feature of the group of original images takes +1, 0, and -1 can respectively be calculated from the appearance frequency.

Accordingly, the discrimination capability $D(S_N)$ held by a collection of features can be calculated as the sum of information entropies $H(X_n)$ of the respective features, for example, from the following formula.

$$D(S_N) = \sum_{n=1}^{N} H(X_n) \quad \text{(Formula 4)}$$

(2) Further, the discrimination capability of a collection of features becomes larger if correlation between the respective features is lower and probability independency is higher, because redundancy is lower. If features having large correlation between them are collected, redundancy becomes higher, so that the discrimination capability for discriminating images will not be improved. As a scale indicating correlation between the respective features, mutual information amount can be used.

The mutual information amount $I(X_n; X_k)$ between the probability variable $X_n$ of a feature n and the probability variable $X_k$ of a feature k is calculated from the following formula:

$$I(X_n; X_k) = \Sigma_{BB} \Sigma_{CC} p(x_n, x_k) \log [p(x_n, x_k)/\{p(x_n) p(x_k)\}] \quad \text{(Formula 5)}$$

where the lower index BB of $\Sigma$ represents $x_n \in \chi_n$ and CC represents $x_k \in \chi_k$.

In this example, $p(x_n, x_k) = \Pr(X_n = x_n, X_k = x_k)$, which indicates a simultaneous probability of $x_n$ and $x_k$. $p(x_n, x_k)$ is calculated from values of features of a group of original images to be supplied. For example, if the features are multi-shape region comparison features described above, the following equations are established.

$p(+1,+1)=Pr(X_n=+1,X_k=+1), p(+1,0)=Pr(X_n=+1,X_k=0)$ $p(+1,-1)=Pr(X_n=+1,X_k=-1), p(0,+1)=Pr(X_n=0,X_k=+1)$ $p(0,0)=Pr(X_n=0,X_k=0), p(0,-1)=Pr(X_n=0,X_k=-1)$ $p(-1,+1)=Pr(X_n=-1,X_k=+1), p(+1,0)=Pr(X_n=-1,X_k=0)$ $p(-1,-1)=Pr(X_n=-1,X_k=-1)$

As such, the simultaneous probability may be calculated from the appearance frequency of combinations of the feature n and the feature k of the group of original images.

As the mutual information amount $I(X_n;X_k)$ between the probability variable $X_n$ of the feature n and the probability variable $X_k$ of the feature k is a scale indicating the degree of correlation between the two features, it can be understood that as the mutual information amount $I(X_n;X_k)$ is smaller, the discrimination capability is larger. As such, the discrimination capability $D(S_N)$ of the collection of features can be calculated by the following formula, based on the sum of all combinations of the features.

$$DS_{(N)} = -\sum_{n=1}^{N} \sum_{k=n+1}^{N} I(X_n; X_k) \quad \text{(Formula 6)}$$

In this example, the reason of the sum of the mutual information amount being negative ("−" is attached) is that the value of the discrimination capability $D(S_N)$ is larger as the sum of the mutual information amount is smaller.

(3) Further, the discrimination capability $D(S_N)$ of a collection of features may be calculated according to the following formula using the sums of Formula 4 and Formula 6.

$$DS_{(N)} = \sum_{n=1}^{N} H(X_n) - \sum_{n=1}^{N} \sum_{k=n+1}^{N} I(X_n; X_k) \quad \text{(Formula 7)}$$

(4) Further, the discrimination capability $D(S_N)$ of the collection of features may be calculated as a joint entropy $H(X_1, X_2, \ldots X_N)$ of the collection $S_N=\{X_1, X_2, \ldots X_N\}$, rather than calculating the sum of the information entropy $H(X_n)$ of the features as Formula 4. As such, the discrimination capability $D(S_N)$ may be calculated according to the following formula.

$D(S_N)=H(X_1,X_2,\ldots X_N)=-\Sigma_{DD} p(x_1,x_2,\ldots x_N) \log p(x_1,x_2,\ldots x_N)$ (Formula 8)

where the lower index DD of $\Sigma$ represents $x_1 \in X_1, x_2 \in X_2, x_N \in X_N$ However, in the calculation of the joint entropy according to Formula 8, as the number of features increases, the amount of calculation increases in the order of indexes. As such, if the number of N is large, it is not practical.

The methods of calculating the discrimination capability $D(S_N)$ according to Formula 4, Formula 6, Formula 7, and Formula 8 described above are examples, and are not limited to these calculation methods.

It should be noted that the discrimination capability may be calculated from the value of a feature (probability variable $X'_n$) of a group of altered images, rather than the value of a feature (probability variable $X_n$) of the group of original images, or may be calculated from a combination thereof.

[Specific Example of Robustness $R(S_N, S'_N)$ Calculation Method]

(1) The robustness $R(S_N, S'_N)$ held by a collection of features may be obtained as the sum of the degrees that the values of the features do not vary before and after alteration of the image with respect to the respective features. This is calculated by comparing the value of a feature (probability variable $X_n$) of a group of original images to be supplied with the value of a feature (probability variable $X'_n$) of the corresponding group of altered images, and measuring the equivalence probability (probability that values of features coincide=unvarying probability). It should be noted that the equivalence probability of the values of the features before and after alteration of the image is represented as $p(x_n = x'_n)$. For example, if the feature is a multi-shape region comparison feature described above, the following expression is established:

$p(x_n=x'_n)=Pr(X_n=1,X'=+1,X'_n=+1)+Pr(X_n=0,X'_n=0)+Pr(X_n=-1,X'_n=-1)$.

The robustness $R(S_N, S'_N)$ of the collection of features may be calculated according to the following formula, as the sum of the equivalence probability $p(x_n=x'_n)$ of the respective features, for example.

$$R(S_N, S'_N) = \sum_{n=1}^{N} p(x_n = x'_n) \quad \text{(Formula 9)}$$

(2) Further, the robustness $R(S_N, S'_N)$ of a collection of features may be calculated based on a conditional entropy $H(X_n|X'_n)$ of each of the features, calculated from the value of the feature (probability variables $X_n$) in a group of original images and the corresponding value of the feature (probability variables $X_n$) in a group of altered images, for example.

As the conditional entropy $H(X_n|X'_n)$ of a feature n indicates the ambiguity of the probability variable Xn (value of the feature in the group of original images) which remains when the probability variable X'n (value of the feature in the group of altered images) has been known, if the probability that the value of feature does not vary before and after the alteration is high (probability that the features coincide before and after the alteration is high), that is, if the robustness if high, the conditional entropy $H(X_n|X'_n)$ takes a smaller value. As such, it can be understood that as the conditional entropy $H(X_n|X'_n)$ is smaller, the robustness is higher. The conditional entropy $H(X_n|X'_n)$ of the feature n may be calculated according to the following formula.

$H(X_n|X'_n)=-\Sigma_{EE}\Sigma_{FF} p(x_n,x'_n) \log p(x_n|x'_n)$ (Formula 10)

where the lower index EE of $\Sigma$ represents $x_n \in X_n$ and FF represents $x'_n \in X_n$.

It should be noted that $p(x_n|x'_n)$ is a conditional probability, which may be calculated from the value of a feature in the group of original images to be supplied and the value of the corresponding feature in the group of altered images. For example, if the feature is a multi-shape region comparison feature described above, the following expressions are established.

$p(+1|+1)=Pr(X_n=+1|X'_n=+1), p(+1|0)=Pr(X_n=+1|X'_n=0)$ $p(+1|-1)=Pr(X_n=+1|X'_n=-1), p(0|+1)=Pr(X_n=0|X'_n=+1)$ $p(0|0)=Pr(X_n=0|X'_n=0), p(0|-1)=Pr(X_n=0|X'_n=-1)$ $p(-1|+1)=Pr(X_n=-1|X'_n=+1), p(-1|0)=Pr(X_n=-1|X'_n=0)$ $p(-1|-1)=Pr(X_n=-1|X'_n=-1)$

The robustness $R(S_N, S'_N)$ held by a collection of features may also be calculated according to the following formula, based on the sum of conditional entropies $H(X_n|X'_n)$ of the respective features.

$$R(S_N, S'_N) = -\sum_{n=1}^{N} H(X_n|X'_n) \quad \text{(Formula 11)}$$

In this example, the reason of the sum of the conditional entropies $H(X_n|X'_n)$ being negative ("−" is attached) is that the value of the robustness $R(S_N, S'_N)$ is larger as the sum of the conditional entropies $H(X_n|X'_n)$ is smaller.

The methods of calculating the robustness $R(S_N, S'_N)$ according to Formulas 9 and 11 described above are examples, and are not limited to these calculation methods.

[Specific Example of Method of Calculating Sum $E(S_N, S'_N)$ of Discrimination Capability and Robustness]

The sum $E(S_N, S'_N)$ of the discrimination capability and the robustness may be calculated by combining any one of Formula 4, Formula 6, Formula 7, and Formula 8 as a method of calculating the discrimination capability $D(S_N)$ and any one of Formula 9 and Formula 11 as a method of calculating the robustness $R(S_N, S'_N)$.

Further, the sum of the discrimination capability $D(S_N)$ and the robustness $R(S_N, S'_N)$ may be calculated according to the following formula using an appropriate weighting coefficient $\alpha$.

$$E(S_N, S'_N) = \alpha D(S_N) + (1-\alpha) R(S_N, S'_N) \quad \text{(Formula 12)}$$

In this example, as an exemplary combination, a method of calculating the sum $E(S_N, S'_N)$ of the discrimination capability and the robustness, in the case of using Formula 7 as a method of calculating the discrimination capability $D(S_N)$ and Formula 11 as a method of calculating the robustness $R(S_N, S'_N)$, is shown in the following formula.

$$\begin{aligned} E(S_N, S'_N) &= D(S_N) + R(S_N, S'_N) \quad \text{(Formula 13)} \\ &= \sum_{n=1}^{N} H(X_n) - \sum_{n=1}^{N}\sum_{k=n+1}^{N} |(X_n; X_k)| - \\ &\quad \sum_{n=1}^{N} H(X_n|X'_n) \\ &= \sum_{n=1}^{N} |(X_n; X'_n)| - \sum_{n=1}^{N}\sum_{k=n+1}^{N} |(X_n; X_k)| \end{aligned}$$

It should be noted that development of Formula 13 is based on $|(X;Y)| = H(X) - H(X|Y)$.

The feature selection unit 14 selects the N types of features such that the value of $E(S_N, S'_N)$ by the evaluation formula 2 of the sum of the discrimination capability and the robustness described above becomes larger. For example, the feature selection unit 14 may select a collection of the N types of features in which the value of $E(S_N, S'_N)$ becomes maximum in a lump. However, it is generally difficult to select a collection of the N types of features in which the value of $E(S_N, S'_N)$ becomes large in a lump, because as it is necessary to calculate $E(S_N, S'_N)$ for every combination of features and evaluate them, the number of combinations becomes enormous.

In view of the above, a method of selecting a collection of features by sequentially (incrementally) adding features such that the value of $E(S_N, S'_N)$ becomes large, is provided as a practicable method. This method is to be called an incremental method. In the incremental method, the N types of features (probability variable $X_n$) are selected by increasing the collections of features one by one. As such, features are added one by one in the following manner.

$$S_1 = \{X_1\}$$
$$S_2 = \{X_1, X_2\}$$
$$S_3 = \{X_1, X_2, X_3\}$$
$$\ldots$$
$$S_N = \{X_1, X_2, \ldots X_N\}$$

In the incremental method, features which allow the value of the evaluation formula 2 of the sum of the discrimination capability and the robustness becomes largest are sequentially selected, and the features are added. When one feature is added to a collection $S_{N-1}$ to form a collection $S_N$, a feature (probability variable) Xn, which allows the value of $E(S_N, S'_N)$ by the evaluation formula 2 of the sum of the discrimination capability and the robustness becomes maximum, is added. This means that a feature (probability variable) Xn, which allows a difference between the value of the evaluation formula 2 of the sum of the discrimination capability and the robustness of the collection of feature before the feature is added and the value of the evaluation formula 2 of the sum of the discrimination capability and the robustness of the collection of features after the feature is added to be maximum, is added. As such, a feature (probability variable) $X_n$, which allows the following evaluation formula $$E(S_N, S'_N) - E(S_{N-1}, S'_{N-1}) \quad \text{(Formula 14)}$$

to be maximum, is added.

For example, if $E(S_N, S'_N)$ obtained by the evaluation formula 13 of the sum of the discrimination capability and the robustness is used, a feature (probability variable) $X_n$, which allows the following evaluation formula 15 to be maximum, is added.

$$E(S_N, S'_N) - E(S_{N-1}, S'_{N-1}) = \left|(X_n; X'_n)\right| - \sum_{k=1}^{N-1}\left|(X_n; X_k)\right| \quad \text{(Formula 15)}$$

Figure 4:
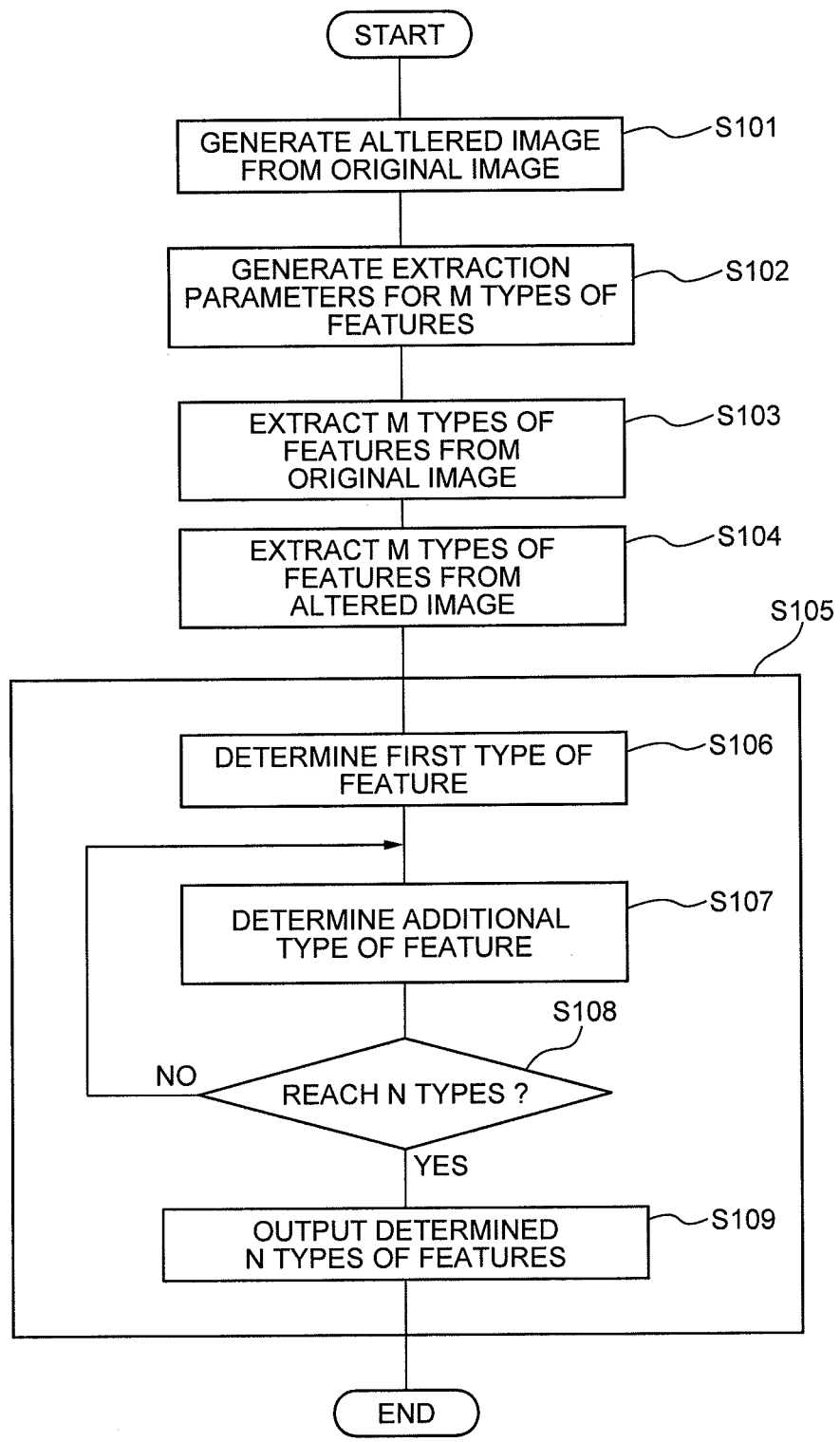
FIG. 4 is a flowchart showing exemplary processes in the first embodiment of the present invention.
Figure 5:
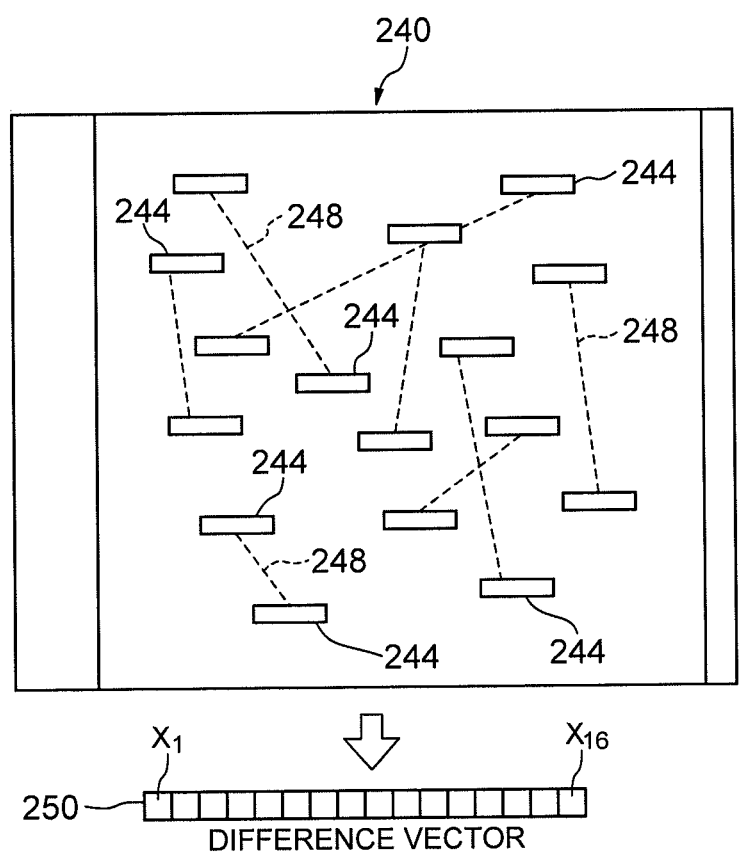
FIG. 5 is an illustration showing a method of extracting image signatures described in Patent Document 1.
Figure 6:
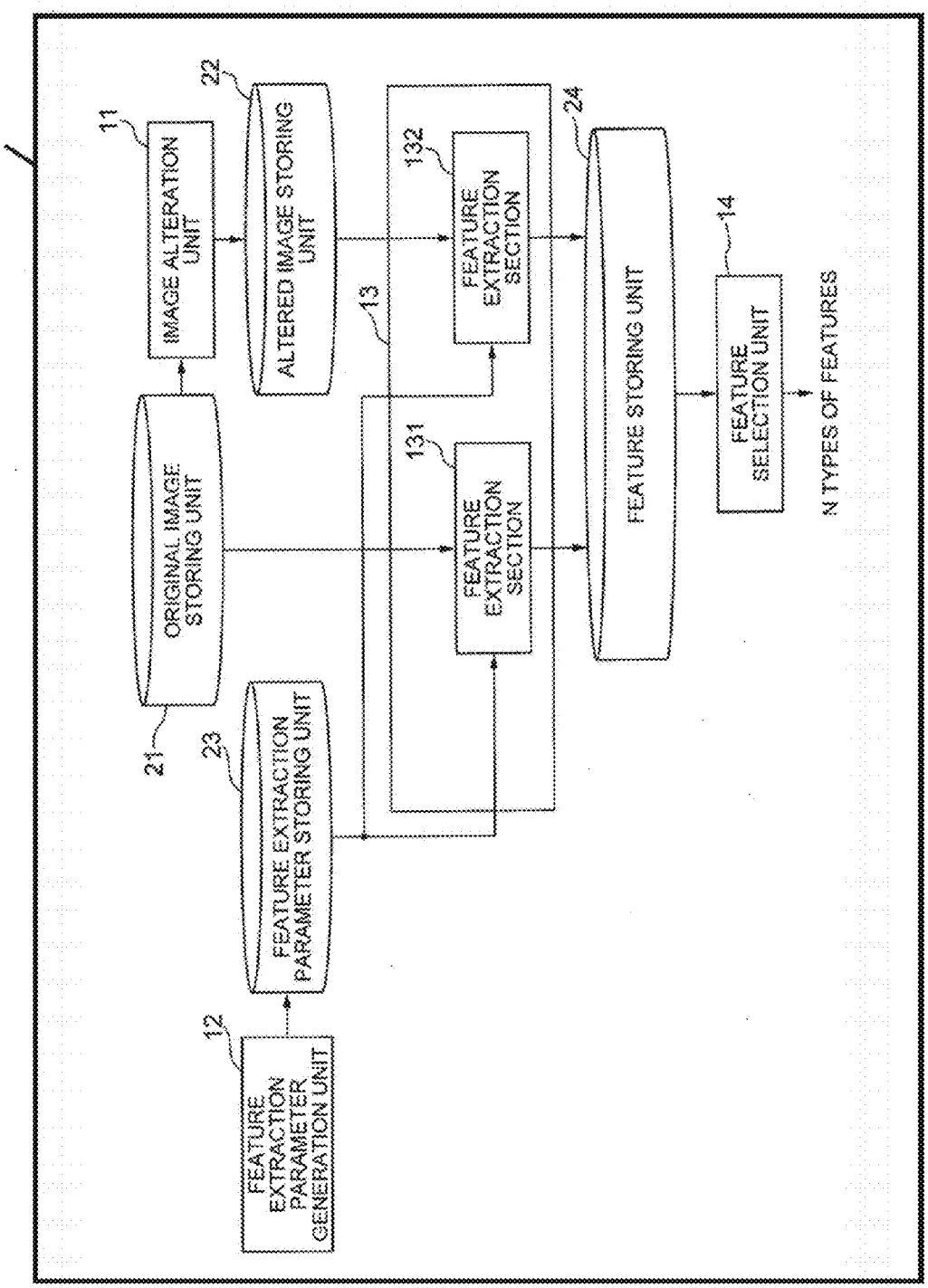
FIG. 6 illustrates a feature extraction device according to another embodiment of the invention.

Next, operation of the present embodiment will be described with reference to the flowchart of FIG. 4.

First, the image alteration unit 11 performs a predetermined type of alteration process on each of the original images read from the original image storing unit 21 to generate an altered image, and stores it in the altered image storing unit 22 (S101).

Next, the feature extraction parameter generation unit 12 generates, for each of the M types of features, a feature extraction parameter which is a parameter for extracting a feature from the image, and stores it in the feature extraction parameter storing unit 23 (S102).

Then, the feature extraction section 131 of the feature extraction unit 13 extracts the M types of features from each of the original images in the original image storing unit 21 in accordance with the extraction parameters for the M types of features, and stores them in the feature storing unit 24 (S103). Further, the feature extraction section 132 of the feature extraction unit 13 extracts the M types of features from each of the altered images in the altered image storing unit 22 in accordance with the extraction parameters for the M types of features, and stores them in the feature storing unit 24 (S104).

Then, the feature selection unit 14 receives the M types of features of the original images and the altered images stored in the feature storing unit 24, and handles them such that an original image and its altered image, and altered images of the same original image are recognized as identical images to each other while other images are different from each other, and selects N types of features from the M types of features, with the discrimination capability which is a degree of discriminating different images and the robustness which is a degree that the value of a feature does not vary due to an alteration process applied to an image being evaluation criteria, and outputs them (S105). Step S105 will be described in detail below, using the incremental method as an example.

First, the feature selection unit 14 determines a first type of feature (S106). For example, the feature selection unit 14 selects one type of feature which allows the value of the evaluation formula of the sum of discrimination capability and robustness to be maximum, and determines the selected type to be the first type. Specifically, the feature selection unit 14 selects a type of feature which allows the value of the evaluation formula 13 to be maximum, where N=1. As another method, it is also possible to select one type of feature from the M types of features in a random manner.

Next, the feature selection unit 14 determines an additional type of feature (S107). Specifically, the feature selection unit 14 selects a type of feature which allows a difference between the value of an evaluation formula of the sum of the discrimination capability and robustness of a collection of features before the feature is added and the value of the evaluation formula of the sum of the discrimination capability and robustness of a collection of features after the feature is added (that is, a value of Formula 14) to be maximum, and the selected type of feature is determined to be a feature which is to be added next.

Then, the feature selection unit 14 judges whether or not the N types of features are determined (S108), and if the N types of features have not been determined, the feature selection unit 14 returns to step S107 and continue to determine the remaining types of features. On the other hand, if the N types of features have been determined, the feature selection unit 14 outputs the determined N types of features to a storing unit not shown in FIG. 1, for example.

As described above, according to the present embodiment, it is possible to select features such that the capability of image signatures for discriminating images, each of which is formed of a collection of a plurality of features, to be optimum (determination accuracy of the identity of images to be higher).

This is because features are selected such that, with use of values of features extracted from groups of images before and after alteration, the sum of the discrimination capability which is a degree of discriminating different images and robustness which is a degree that the value of a feature does not vary due to an alteration process applied to an image becomes large.

While the embodiment of the present invention has been described above, the present invention is not limited to this embodiment. It will be understood by those of ordinary skill in the art that various changes in form and details may be made therein without departing from the scope of the present invention. Further, the feature extraction device of the present invention is adapted such that the functions thereof can be realized by computers 600 and programs, as well as hardware. Such a program is provided in the form of being written on a computer readable recording medium such as a magnetic disk, a semiconductor memory, or the like, is read by a computer when the computer is started for example, and controls operation of the computer, to thereby allow the computer to function as the image alteration unit 11, the feature extraction parameter generation unit 12, the feature extraction unit 13, the feature selection unit 14, and the like of the above-described embodiment.

This application is based upon and claims the benefit of priority from Japanese patent application No. 2009-17806, filed on Jan. 29, 2009, the disclosure of which is incorporated herein in its entirety by reference.

REFERENCE NUMERALS

11 image alteration unit
12 feature extraction parameter generation unit
13 feature extraction unit
131, 132 feature extraction section
14 feature selection unit
21 original image storing unit
22 altered image storing unit
23 feature extraction parameter storing unit
24 feature storing unit

The invention claimed is:

1. A feature extraction device comprising:
a feature extraction unit that extracts M types of features from each of a plurality of original images and each of a plurality of altered images obtained by applying an alteration; and
a feature selection unit that selects a collection of N types of features from the M types of features extracted from each of the plurality of the original images and each of the plurality of the altered images, the N types being smaller in number than that of the M types, based on a value of an evaluation formula represented by a sum of discrimination capability and robustness, the discrimination capability being a degree of distinguishing respectively two different original images, an original image and an altered image obtained by applying an alteration process to an original image different from the original image, and two altered images obtained by respectively applying an alteration process to two original images that are different from each other, the robustness being a degree that a value of a feature of the original image does not vary due to an alteration process applied to the original image, wherein
the feature selection unit calculates, with use of the features extracted from the respective images, discrimination capability of the N types of features as a value of a sum of information entropies of the N types of features, a joint entropy of a collection including the N types of features, or a value of a sum of mutual information amounts between the N types of features.

2. The feature extraction device, according to claim 1, wherein
the feature extraction unit extracts the M types of features in accordance with M type of feature extraction parameters, each of the M type of feature extraction parameters specifies methods for extracting one of the M types of features.

3. The feature extraction device, according to claim 2, further comprising:
a feature extraction parameter generation unit that generates the M type of feature extraction parameters; and
a feature extraction parameter storing unit that stores the generated M types of feature extraction parameters.

4. The feature extraction device, according to claim 3, wherein
the feature extraction parameter generation unit generates a pseudo random number string, and generates the feature extraction parameters based on the generated random numbers.

5. The feature extraction device, according to claim 1, wherein
the feature extraction parameters have definition information regarding shapes and positions of M types of pairs of sub-regions to be used for extracting any of the M types of features from an image, and the M types of pairs of sub-regions include at least one pair of sub-regions in which both a combination of the shapes of the pair of two sub-regions and a relative position between the pair of two sub-regions differ from those of at least another one pair of sub-regions.

6. The feature extraction device, according to claim 1, wherein
each of the M types of features extracted from each image of the plurality of the original images and the plurality of the altered images is a quantization value obtained by quantizing a physical amount extracted from the each image.

7. The feature extraction device, according to claim 1, further comprising:
an original image storing unit that stores the plurality of the original images;
an image alteration unit that generates altered images obtained by applying an alteration process to the original images; and
an altered image storing unit that stores the generated altered images.

8. The feature extraction device, according to claim 7, wherein
the image alteration unit performs one or more alteration processes among conversion of a size of the image, conversion of an aspect ratio of the image, adjustment of color tone of the image, conversion of a color of the image into monochrome, various filtering processes performed on the image, local processing performed on the image, geometric conversion of the image, addition of black bars to the image, and recapturing of the image.

9. The feature extraction device, according to claim 1, wherein
the feature selection unit calculates, with use of the features extracted from the original image and the features extracted from the altered image, robustness of the N types of features as a value of a sum of equivalence probabilities between the features before alteration and the features after the alteration of the N types of features, or a value of a sum of conditional entropies of the N types of features.

10. The feature extraction device, according to claim 1, wherein
the feature selection unit selects features included in a collection of features as the N types of features by adding to the collection, one by one, a feature of the M types of features which allows a difference between a value of the evaluation formula of the collection before addition of the feature and a value of the evaluation formula of the collection after the addition of the feature to be maximum.

11. A feature extraction method performed by a computer, the method comprising:
extracting M types of features from each of a plurality of original images and each of a plurality of altered images obtained by applying an alteration process to the plurality of original images;
selecting a collection of N types of features from the M types of features extracted from each of the plurality of the original images and each of the plurality of the altered images, the N types being smaller in number than that of the M types, based on a value of an evaluation formula represented by a sum of discrimination capability and robustness, the discrimination capability being a degree of distinguishing respectively two different original images, an original image and an altered image obtained by applying an alteration process to an original image different from the original image, and two altered images obtained by applying an alteration process respectively to two original images that are different from each other, the robustness being a degree that a value of a feature of the original image does not vary due to an alteration process applied to the original image; and
with use of the features extracted from the respective images, calculating the discrimination capability of the N type of features as a value of a sum of information entropies of the N types of features, a joint entropy of a collection including the N types of features, or a value of a sum of mutual information amounts between the N types of features.

12. The feature extraction method, according to claim 11, wherein the extracting the M types of features includes extracting the M types of features in accordance with M type of feature extraction parameters, each of the M type of feature extraction parameters specifies methods for extracting one of the M types of features.

13. The feature extraction method, according to claim 12, further comprising:
generating the M type of feature extraction parameters.

14. The feature extraction method, according to claim 13, wherein
the generating the feature extraction parameter includes generating a pseudo random number string, and generating the feature extraction parameters based on the generated random numbers.

15. The feature extraction method, according to claim 11, wherein
the feature extraction parameters have definition information regarding shapes and positions of M types of pairs of sub-regions to be used for extracting any of the M types of features from an image, and the M types of pairs of sub-regions include at least one pair of sub-regions in which both a combination of the shapes of the pair of two sub-regions and a relative position between the pair of two sub-regions differ from those of at least another one pair of sub-regions.

16. The feature extraction method, according to claim 11, wherein
each of the M types of features extracted from each image of the plurality of the original images and the plurality of the altered images is a quantization value obtained by quantizing a physical amount extracted from the each image.

17. The feature extraction method, according to claim 11, further comprising:
generating altered images obtained by applying an alteration process to the original images.

18. The feature extraction method, according to claim 17, wherein the generating the altered images includes performing one or more alteration processes among conversion of a size of the image, conversion of an aspect ratio of the image, adjustment of color tone of the image, conversion of the color of the image into monochrome, various filtering processes performed on the image, local processing performed on the image, geometric conversion of the image, addition of black bars to the image, and recapturing of the image.

19. The feature extraction method, according to claim 11, wherein the selecting the collection includes, with use of the features extracted from the original image and the features extracted from the altered image, calculating robustness of the N type of features as a value of a sum of equivalence probabilities between the features before alteration and the features after the alteration of the N types of features, or a value of a sum of conditional entropies of the N types of features.

20. The feature extraction method, according to claim 11, wherein the selecting the collection includes selecting features included in a collection of features as the N types of features by adding to the collection, one by one, a feature of the M types of features which allows a difference between a value of the evaluation formula of the collection before addition of the feature and a value of the evaluation formula of the collection after the addition of the feature to be maximum.

21. A non-transitory computer readable medium storing a program comprising instructions for causing a computer to function as:

a feature extraction unit that extracts M types of features from each of a plurality of original images and each of a plurality of altered images obtained by applying an alteration process to the plurality of original images; and a feature selection unit that selects a collection of N types of features from the M types of features extracted from each of the plurality of the original images and each of the plurality of the altered images, the N types being smaller in number than that of the M types, based on a value of an evaluation formula represented by a sum of discrimination capability and robustness, the discrimination capability being a degree of distinguishing respectively two different original images, an original image and an altered image obtained by applying an alteration process to an original image different from the original image, and two altered images obtained by respectively applying an alteration process to two original images that are different from each other, the robustness being a degree that a value of a feature of the original image does not vary due to an alteration process applied to the original image, wherein the feature selection unit calculates, with use of the features extracted from the respective images, discrimination capability of the N types of features as a value of a sum of information entropies of the N types of features, a joint entropy of a collection including the N types of features, or a value of a sum of mutual information amounts between the N types of features.

\* \* \* \* \*

UNITED STATES PATENT AND TRADEMARK OFFICE
CERTIFICATE OF CORRECTION

PATENT NO. : 8,620,087 B2  Page 1 of 1
APPLICATION NO. : 13/056767
DATED : December 31, 2013
INVENTOR(S) : Kota Iwamoto and Ryoma Oami It is certified that error appears in the above-identified patent and that said Letters Patent is hereby corrected as shown below:

On the Title Page, References Cited

Column 2, Other Publications, Line 3: Delete "27," and insert -- 17, --

In the Specification

Column 10, Line 29: Delete "$Pr(X_n+1)$," and insert -- $Pr(X_n=+1)$, --

Column 10, Line 61: Delete " $X_k \Theta Y_k$, " and insert --  --

Signed and Sealed this
Eighteenth Day of November, 2014

Michelle K. Lee
*Deputy Director of the United States Patent and Trademark Office*